US012587699B2

(12) United States Patent　　　　　(10) Patent No.:　US 12,587,699 B2

Nishijima　　　　　　　　　　　　　(45) Date of Patent:　　Mar. 24, 2026

(54) SYNCHRONIZING PLAYBACK OF MULTIMEDIA BETWEEN IN-VEHICLE AND MOBILE DEVICES

(71) Applicant: Nissan North America, Inc., Franklin, TN (US)

(72) Inventor: David Masao Nishijima, San Jose, CA (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 18/421,422

(22) Filed: Jan. 24, 2024

(65) Prior Publication Data

US 2025/0240477 A1　　Jul. 24, 2025

(51) Int. Cl.
*H04N 21/43*　　　(2011.01)
*B60K 35/28*　　　(2024.01)

(52) U.S. Cl.
CPC ....... *H04N 21/43076* (2020.08); *B60K 35/28* (2024.01)

(58) Field of Classification Search
CPC .......................... H04N 21/43076; B60K 35/28
See application file for complete search history.

(56) References Cited

U.S. PATENT DOCUMENTS

| | | | | |
|---|---|---|---|---|
| 8,027,560 B2 * | 9/2011 | Brady, Jr. | ........ | H04N 21/43076 |
| | | | | 348/521 |
| 10,291,672 B2 * | 5/2019 | Jamal-Syed | ........... | G11B 27/00 |

| | | | | |
|---|---|---|---|---|
| 2006/0161835 A1 * | 7/2006 | Panabaker | ........... | H04N 21/654 |
| | | | | 375/E7.015 |
| 2009/0249405 A1 * | 10/2009 | Karaoguz | .......... | H04N 21/2343 |
| | | | | 725/62 |
| 2012/0082424 A1 * | 4/2012 | Hubner | ................ | H04N 21/242 |
| | | | | 386/E5.032 |
| 2013/0005258 A1 * | 1/2013 | Uefuji | ................... | G06F 9/4856 |
| | | | | 455/41.2 |
| 2013/0070860 A1 | 3/2013 | Schramm et al. | | |
| 2014/0215535 A1 * | 7/2014 | Elliott | ................. | H04N 21/242 |
| | | | | 725/81 |
| 2014/0323036 A1 * | 10/2014 | Daley | .................... | H04H 20/38 |
| | | | | 455/3.06 |

(Continued)

FOREIGN PATENT DOCUMENTS

| | | | |
|---|---|---|---|
| WO | 2016/008131 A1 | 1/2016 | |
| WO | 2020/072770 A1 | 4/2020 | |

*Primary Examiner* — James R Sheleheda

(74) *Attorney, Agent, or Firm* — Young Basile Hanlon & MacFarlane, P.C.

(57)　　　　　　　ABSTRACT

Synchronizing playback of multimedia content between playback devices integrated into a primary device, such as an in-vehicle infotainment (IVI) system and one or more nearby secondary devices, such as mobile devices, being served multimedia content by the IVI system. The IVI system determines a playback latency of each mobile device and serves the multimedia content to each primary and secondary playback device with a respective delay based on a difference between a maximum playback latency across all playback devices and the respective determined playback latency. In some implementations, playback latencies may be determined using an audio signal. In other implementations, playback latencies may be determined using satellite-synchronized timestamps.

18 Claims, 8 Drawing Sheets

7000

7010 — SENDING A FIRST MESSAGE FROM A PRIMARY DEVICE TO A FIRST SECONDARY DEVICE

7020 — RECEIVING A FIRST RESPONSE FROM THE FIRST SECONDARY DEVICE AT THE PRIMARY DEVICE

7030 — DETERMINING A FIRST DURATION BASED ON THE FIRST MESSAGE AND THE FIRST RESPONSE

7040 — SENDING, AT A START TIME, A FIRST MULTIMEDIA MESSAGE COMPRISING FIRST MULTIMEDIA GRAPHICAL INFORMATION FROM THE PRIMARY DEVICE TO THE FIRST SECONDARY DEVICE FOR DISPLAYING VIA A FIRST GRAPHICAL DISPLAY OF THE FIRST SECONDARY DEVICE

7050 — DISPLAYING, AT A TIME SUBSTANTIALLY EQUAL TO THE START TIME PLUS THE FIRST DURATION, THE FIRST MULTIMEDIA GRAPHICAL INFORMATION VIA A GRAPHICAL DISPLAY OF THE PRIMARY DEVICE

(56) References Cited

U.S. PATENT DOCUMENTS

| | | | | |
|---|---|---|---|---|
| 2015/0131645 A1* | 5/2015 | Reunamaki | .......... | H04W 56/00 |
| | | | | 370/350 |
| 2016/0080459 A1* | 3/2016 | Kuwelkar | .......... | H04N 21/8547 |
| | | | | 709/219 |
| 2016/0088339 A1* | 3/2016 | Nakanishi | .............. | H04N 9/806 |
| | | | | 725/74 |
| 2016/0182176 A1* | 6/2016 | Ramachandra | ....... | H04J 3/0661 |
| | | | | 370/429 |
| 2016/0191584 A1* | 6/2016 | Dickow | .................. | H04L 65/80 |
| | | | | 709/219 |
| 2016/0210110 A1 | 7/2016 | Feldman | | |
| 2017/0006331 A1* | 1/2017 | Jairath | ............... | H04N 21/4305 |
| 2017/0041357 A1* | 2/2017 | Wang | ................... | H04L 65/403 |
| 2018/0167149 A1* | 6/2018 | Stilwell | ................... | H04W 4/80 |
| 2018/0288365 A1* | 10/2018 | Greene | ........... | H04N 21/44227 |
| 2019/0045471 A1 | 2/2019 | Keyser-Allen et al. | | |
| 2019/0054864 A1* | 2/2019 | Gonzalez | ............... | B60R 11/02 |
| 2019/0116395 A1 | 4/2019 | Kerdranvat et al. | | |
| 2019/0320302 A1* | 10/2019 | Sol | ..................... | B60R 11/0264 |
| 2020/0091957 A1* | 3/2020 | Curtis | ...................... | H04B 1/69 |
| 2020/0128291 A1* | 4/2020 | Morales | ............. | H04N 21/8106 |
| 2020/0312374 A1* | 10/2020 | Olofsson | ................. | G11B 27/11 |
| 2021/0044867 A1* | 2/2021 | Butters | ............. | H04N 21/4302 |
| 2021/0311692 A1* | 10/2021 | Berger | ...................... | G06F 1/12 |
| 2022/0109944 A1 | 4/2022 | Fan et al. | | |
| 2022/0123850 A1* | 4/2022 | Adrian | .................. | H04J 3/0697 |
| 2022/0360838 A1* | 11/2022 | Dalal | .............. | H04N 21/43615 |
| 2023/0123223 A1* | 4/2023 | Gong | .................... | H04L 67/306 |
| | | | | 709/217 |
| 2023/0214171 A1* | 7/2023 | Winton | .............. | H04N 21/4788 |
| | | | | 715/716 |
| 2023/0216897 A1* | 7/2023 | Winton | ................. | H04L 65/403 |
| | | | | 455/416 |
| 2023/0252987 A1* | 8/2023 | Yae | .......................... | G10L 15/30 |
| | | | | 704/275 |
| 2023/0421347 A1* | 12/2023 | Hsieh | ........................ | G06F 1/08 |
| 2024/0022783 A1* | 1/2024 | Zhang | .............. | H04N 21/4307 |
| 2024/0073603 A1* | 2/2024 | West | ....................... | G06F 3/165 |
| 2025/0030942 A1* | 1/2025 | Huang | ............. | H04N 1/32117 |
| 2025/0240477 A1* | 7/2025 | Nishijima | ............... | G09G 5/12 |

* cited by examiner

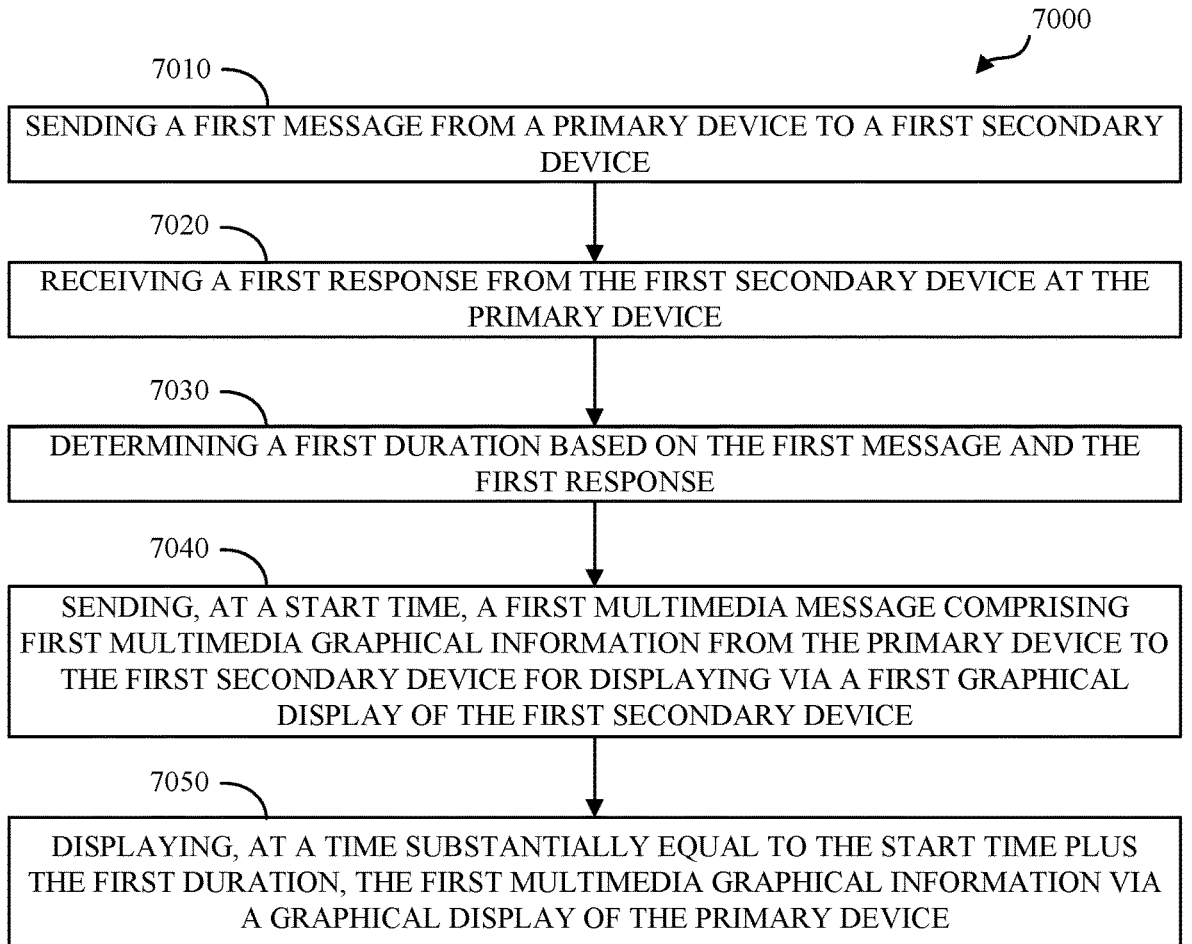

7000

7010
SENDING A FIRST MESSAGE FROM A PRIMARY DEVICE TO A FIRST SECONDARY DEVICE

7020
RECEIVING A FIRST RESPONSE FROM THE FIRST SECONDARY DEVICE AT THE PRIMARY DEVICE

7030
DETERMINING A FIRST DURATION BASED ON THE FIRST MESSAGE AND THE FIRST RESPONSE

7040
SENDING, AT A START TIME, A FIRST MULTIMEDIA MESSAGE COMPRISING FIRST MULTIMEDIA GRAPHICAL INFORMATION FROM THE PRIMARY DEVICE TO THE FIRST SECONDARY DEVICE FOR DISPLAYING VIA A FIRST GRAPHICAL DISPLAY OF THE FIRST SECONDARY DEVICE

7050
DISPLAYING, AT A TIME SUBSTANTIALLY EQUAL TO THE START TIME PLUS THE FIRST DURATION, THE FIRST MULTIMEDIA GRAPHICAL INFORMATION VIA A GRAPHICAL DISPLAY OF THE PRIMARY DEVICE

FIG. 7

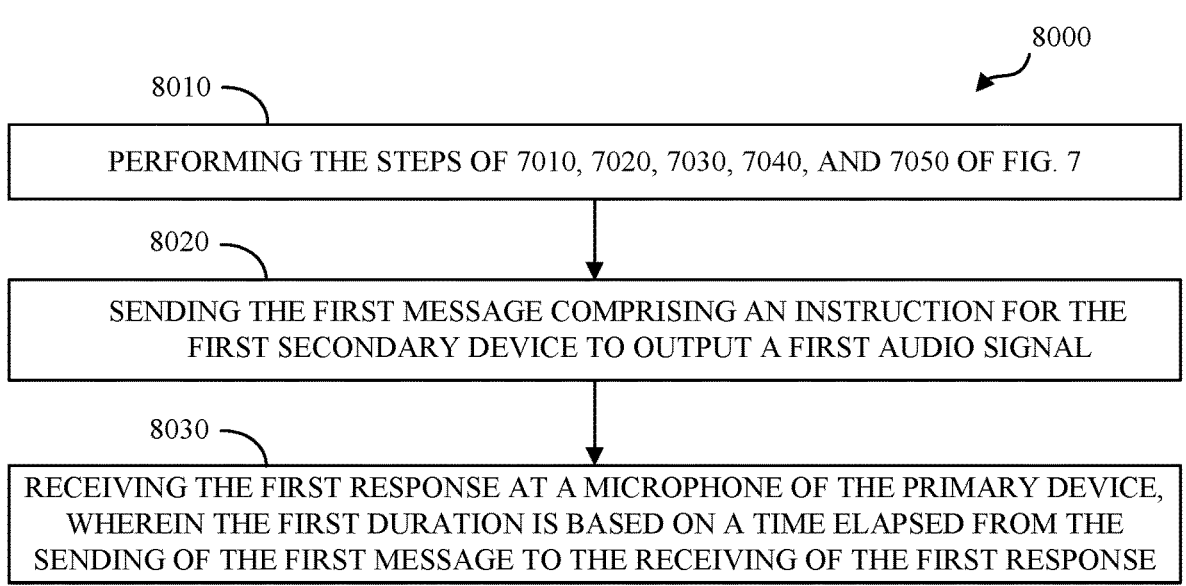

8000

8010

PERFORMING THE STEPS OF 7010, 7020, 7030, 7040, AND 7050 OF FIG. 7

8020

SENDING THE FIRST MESSAGE COMPRISING AN INSTRUCTION FOR THE FIRST SECONDARY DEVICE TO OUTPUT A FIRST AUDIO SIGNAL

8030

RECEIVING THE FIRST RESPONSE AT A MICROPHONE OF THE PRIMARY DEVICE, WHEREIN THE FIRST DURATION IS BASED ON A TIME ELAPSED FROM THE SENDING OF THE FIRST MESSAGE TO THE RECEIVING OF THE FIRST RESPONSE

FIG. 8

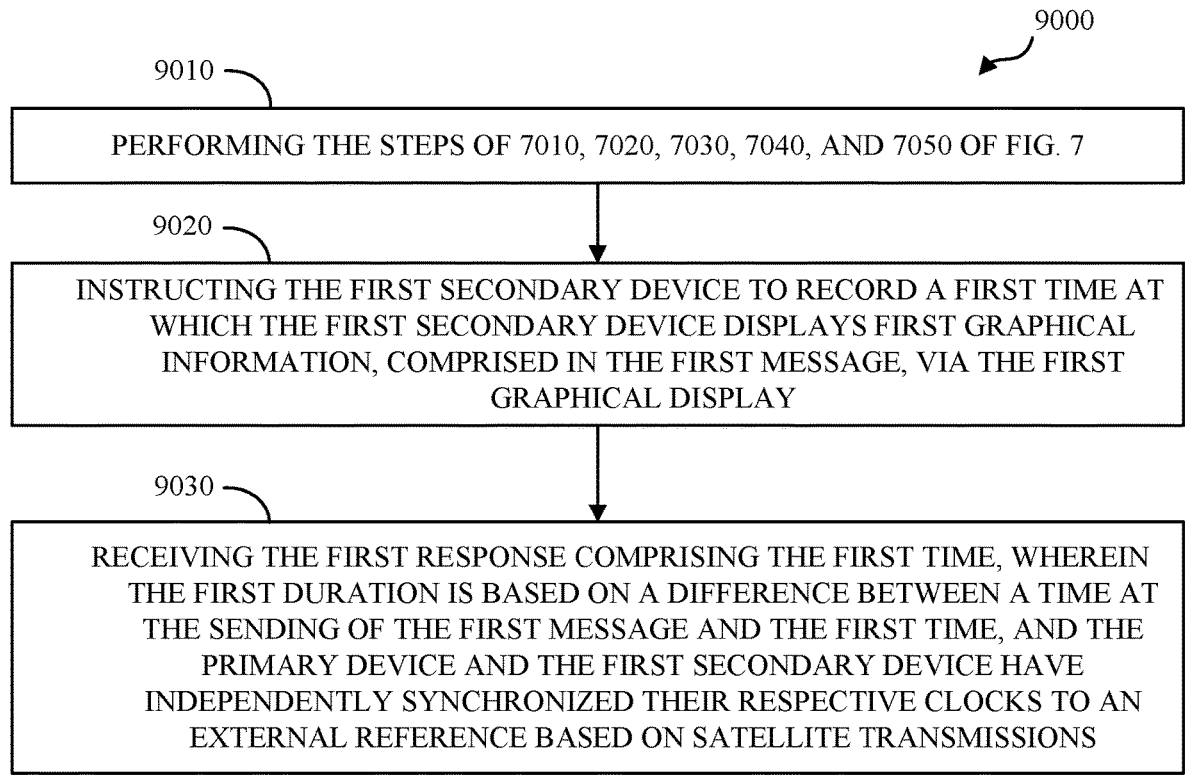

9000

9010

PERFORMING THE STEPS OF 7010, 7020, 7030, 7040, AND 7050 OF FIG. 7

9020

INSTRUCTING THE FIRST SECONDARY DEVICE TO RECORD A FIRST TIME AT WHICH THE FIRST SECONDARY DEVICE DISPLAYS FIRST GRAPHICAL INFORMATION, COMPRISED IN THE FIRST MESSAGE, VIA THE FIRST GRAPHICAL DISPLAY

9030

RECEIVING THE FIRST RESPONSE COMPRISING THE FIRST TIME, WHEREIN THE FIRST DURATION IS BASED ON A DIFFERENCE BETWEEN A TIME AT THE SENDING OF THE FIRST MESSAGE AND THE FIRST TIME, AND THE PRIMARY DEVICE AND THE FIRST SECONDARY DEVICE HAVE INDEPENDENTLY SYNCHRONIZED THEIR RESPECTIVE CLOCKS TO AN EXTERNAL REFERENCE BASED ON SATELLITE TRANSMISSIONS

FIG. 9

SYNCHRONIZING PLAYBACK OF MULTIMEDIA BETWEEN IN-VEHICLE AND MOBILE DEVICES

TECHNICAL FIELD

This disclosure relates generally to synchronization between multimedia devices, and more particularly, to synchronizing playback of multimedia content shared between nearby devices on a network.

BACKGROUND

Many modern vehicles include in-vehicle infotainment (IVI) systems that comprise graphical displays for playing video and speakers for playing audio. Some IVI systems include multiple graphical displays, each conveniently positioned for viewing at various locations with the vehicle. For example, an IVI system may include a display near a center of the dash for convenient viewing by a driver and/or a front passenger, and additional displays each in one of the front-seat headrests for convenient viewing by rear passengers. Despite some IVI systems comprising multiple playback devices, some vehicle occupants (e.g., users) prefer to utilize their own multimedia-capable mobile devices, like smartphones and tablets, to play video and/or audio that is served by the IVI system instead of, or in addition to, utilizing the displays and/or speakers integrated into the vehicle's cabin. However, capabilities and real-time performance of mobile devices vary widely, for example, due to their brand, age, chipset, operating system, available memory, current workload, and so on. Thus, each mobile device may process information received from the IVI system at different speeds, resulting in varying delays in multimedia playback, such as displaying video and/or playing audio. This can result in out-of-synchronization playback between the IVI system and the mobile device(s), detracting from the infotainment experience.

SUMMARY

Disclosed herein are aspects, features, elements, implementations, and embodiments of a method, a system, and a non-transitory computer-readable medium for synchronizing playback of multimedia content shared between nearby devices on a network. In one implementation, the multimedia content, which may comprise graphical information, such as video, and accompanying audio information, such as audio, is served to a secondary device, such as a mobile device, by a primary device, such as such as an in-vehicle infotainment (IVI) system, for playback by the secondary device. The IVI system may additionally playback the multimedia content on one or more graphical displays that are integrated into the vehicle's cabin with a delay that is based on a determined latency of the mobile device.

While there is typically tight synchronization between the IVI system and the playback devices integrated into the vehicle's cabin, a degree of synchronization between the IVI system and the mobile devices can vary. Thus, multimedia playback by an integrated playback device may be out of synchronization with playback of the same multimedia by the mobile device, thereby creating an unpleasant infotainment experience. As described herein, the playback devices integrated into the vehicle's cabin may be considered part of the IVI system, such that "a playback device of the IVI system" is synonymous with "a playback device integrated into the vehicle's cabin."

One aspect of the disclosed technology is to automatically determine a playback delay, or latency, between a primary playback device, such as a graphical display of an IVI system, and a secondary playback device, such as a graphical display of a mobile device, e.g., a smartphone, a tablet, a virtual-reality (VR) or augmented-reality (AR) headset, a smartwatch, a pair of smart glasses, and so on. The primary device, e.g., the IVI system, may send a message to the secondary system, e.g., the mobile device, and the primary device may subsequently receive a response from the secondary device, from which the primary device may determine a latency, e.g., a playback latency, of the secondary device.

In some implementations, the message instructs the secondary device to play a sound, e.g., a narrowband chirp or tone. The primary device listens for the sound (i.e., the response from the secondary device) via a microphone of the primary device, and the primary device determines that the latency of the secondary device is substantially equal to an amount of time that has elapsed between the sending of the instruction to play the sound and the detection of the played sound by the primary device. In some implementations, the primary device may account for overrepresented delays incurred by the microphone or processors of the primary device to capture, process, and recognize the sound.

In some implementations, the message instructs the secondary device to record a time at which the secondary device displays graphical information, comprised in the message, via the graphical display of the secondary device. The secondary device displays the graphical information, records the time, and sends the time back to the primary device. The primary device determines that the latency of the secondary device is substantially equal to a difference between a time at which the primary device sent the message and the time recorded by the secondary device, where the primary device and the secondary device have independently synchronized their respective clocks to an external reference based on satellite transmissions. In some implementations, the primary device and/or the secondary device may account for potentially underrepresented delays incurred by certain hardware of the second device, such as video memory for buffering the graphical information or graphics processors for processing the information prior to displaying the graphical information via the graphical display.

Although various implementations are described herein with reference to an in-vehicle infotainment (IVI) system as a primary device, the disclosed implementations are applicable to other applications and other primary devices. As an example, a mobile device, such as those listed earlier, can function as a primary device and an IVI system can function as a secondary device, where the mobile device serves multimedia to the IVI system. As another example, in a home setting, a home multimedia server may function as the primary device, where one television set is hardwire-connected to the server (e.g., via an HDMI cable) and other television sets, smartphones, computers, and tablets that are wirelessly connected to the server (e.g., via Wi-Fi) function as secondary devices. The hardwired television set may be tightly synchronized with the server (much like an in-vehicle display may be tightly synchronized with an IVI system), while a degree of synchronization between the server and the wirelessly connected devices may vary (much like a degree of synchronization between the IVI system and the mobile devices may vary).

Variations in these and other aspects, features, elements, implementations, and embodiments of the methods, apparatus, procedures, and algorithms disclosed herein are described in further detail hereafter.

BRIEF DESCRIPTION OF THE DRAWINGS

The various aspects of the methods and systems disclosed herein will become more apparent by referring to the examples provided in the following description and drawings in which like reference numbers refer to like elements unless otherwise noted.

FIG. 7 is a flowchart of an example of a process for determining a latency of a secondary device with respect to a primary device and utilizing the latency to synchronize playback of multimedia information.

FIG. 8 is a flowchart of an example of a process for determining a latency of a secondary device with respect to a primary and utilizing the latency to synchronize playback of multimedia information, wherein the latency is based on detecting a sound output by the secondary device.

FIG. 9 is a flowchart of an example of a process for determining a latency of a secondary device with respect to a primary device and utilizing the latency to synchronize playback of multimedia information, wherein the latency is based on recording a satellite-synchronized timestamp.

DETAILED DESCRIPTION

The following terms may be used herein. "Content," "information," and "data" may be used interchangeably. "Audiovisual information" may refer to data that comprises audio data and/or video data for playback, and it may be considered a subset of multimedia information. "Multimedia information" may refer to data that comprises one or more of graphical information, such as images, video, and graphics for visual presentation; audio information, such as voice, music, and sounds for audible presentation; ambiance information, such as information for adjusting cabin lighting; haptic information, such as information for vibrating car-seat actuators; and so on. "Playback" refers to presenting multimedia information to a user in one or more forms that may be perceived by human senses, where playback encompasses presenting either pre-recorded multimedia information, such as a downloaded movie or a musical playlist, or live-streaming multimedia information, such as a real-time video chat or a teleconference. "Output device" and "playback device" may be used interchangeably to refer to a device or component of a device for effectuating playback of multimedia information. "Latency," "delay," and "duration" may be used interchangeably to refer to a time elapsed between a start time and an end time.

To describe some implementations in greater detail, reference is made to the following figures.

Figure 1:
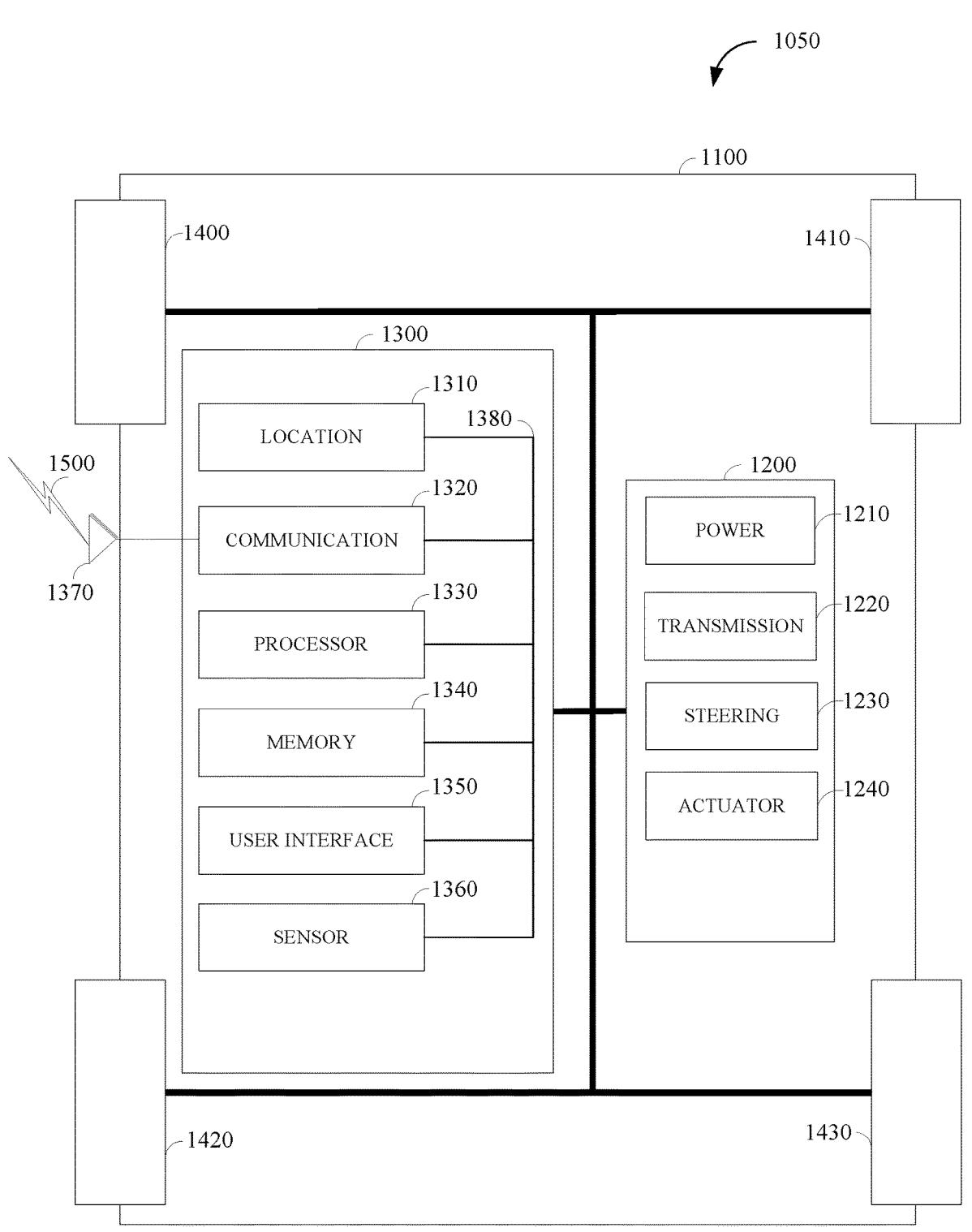
FIG. 1 is a diagram of an example of a portion of a vehicle in which the aspects, features, and elements disclosed herein may be implemented.

FIG. 1 is a diagram of an example of a vehicle 1050 in which the aspects, features, and elements disclosed herein may be implemented. The vehicle 1050 may include a chassis 1100, a powertrain 1200, a controller 1300, wheels 1400/1410/1420/1430, or any other element or combination of elements of a vehicle. Although the vehicle 1050 is shown as including four wheels 1400/1410/1420/1430 for simplicity, any other propulsion device or devices, such as a propeller or tread, may be used. In FIG. 1, the lines interconnecting elements, such as the powertrain 1200, the controller 1300, and the wheels 1400/1410/1420/1430, indicate that information, such as data or control signals, power, such as electrical power or torque, or both information and power, may be communicated between the respective elements. For example, the controller 1300 may receive power from the powertrain 1200 and communicate with the powertrain 1200, the wheels 1400/1410/1420/1430, or both, to control the vehicle 1050, which can include accelerating, decelerating, steering, or otherwise controlling the vehicle 1050.

The powertrain 1200 includes a power source 1210, a transmission 1220, a steering unit 1230, a vehicle actuator 1240, or any other element or combination of elements of a powertrain, such as a suspension, a drive shaft, axles, or an exhaust system. Although shown separately, the wheels 1400/1410/1420/1430 may be included in the powertrain 1200. A braking system may be included in the vehicle actuator 1240.

The power source 1210 may be any device or combination of devices operative to provide energy, such as electrical energy, chemical energy, or thermal energy. For example, the power source 1210 includes an engine, such as an internal combustion engine, an electric motor, or a combination of an internal combustion engine and an electric motor, and is operative to provide energy as a motive force to one or more of the wheels 1400/1410/1420/1430. In some embodiments, the power source 1210 includes a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 receives energy from the power source 1210 and transmits the energy to the wheels 1400/1410/1420/1430 to provide a motive force. The transmission 1220 may be controlled by the controller 1300, the vehicle actuator 1240 or both. The steering unit 1230 may be controlled by the controller 1300, the vehicle actuator 1240, or both and controls the wheels 1400/1410/1420/1430 to steer the vehicle. The vehicle actuator 1240 may receive signals from the controller 1300 and may actuate or control the power source 1210, the transmission 1220, the steering unit 1230, or any combination thereof to operate the vehicle 1050.

In some embodiments, the controller 1300 includes a location unit 1310, an electronic communication unit 1320, a processor 1330, a memory 1340, a user interface 1350, a sensor 1360, an electronic communication interface 1370, or any combination thereof. Although shown as a single unit, any one or more elements of the controller 1300 may be integrated into any number of separate physical units. For example, the user interface 1350 and processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof can be integrated in one or more electronic units, circuits, or chips.

In some embodiments, the processor 1330 includes any device or combination of devices capable of manipulating or processing a signal or other information now existing or hereafter developed, including optical processors, quantum processors, molecular processors, or a combination thereof. For example, the processor 1330 may include one or more special purpose processors, one or more digital signal processors, one or more microprocessors, one or more controllers, one or more microcontrollers, one or more integrated circuits, one or more an application-specific integrated circuits (ASICs), one or more field-programmable gate arrays (FPGAs), one or more programmable logic arrays (PLAs), one or more programmable logic controllers (PLCs), one or more state machines, or any combination thereof. The processor 1330 may be operatively coupled with the location unit 1310, the memory 1340, the electronic communication interface 1370, the electronic communication unit 1320, the user interface 1350, the sensor 1360, the powertrain 1200, or any combination thereof. For example, the processor may be operatively coupled with the memory 1340 via a communication bus 1380.

In some embodiments, the processor 1330 may be configured to execute instructions including instructions for remote operation which may be used to operate the vehicle 1050 from a remote location including a data-processing center. The instructions for remote operation may be stored in the vehicle 1050 or received from an external source such as a traffic management center, or server computing devices, which may include cloud-based server computing devices. The processor 1330 may be configured to execute instructions for following a projected path as described herein.

The memory 1340 may include any tangible non-transitory computer-usable or computer-readable medium, capable of, for example, containing, storing, communicating, or transporting machine readable instructions or any information associated therewith, for use by or in connection with the processor 1330. The memory 1340 is, for example, one or more solid state drives, one or more memory cards, one or more removable media, one or more read only memories, one or more random access memories, one or more solid-state drives, one or more disks, including a hard disk, a floppy disk, an optical disk, a magnetic or optical card, or any type of non-transitory media suitable for storing electronic information, or any combination thereof.

The electronic communication interface 1370 may be a wireless antenna, as shown, a wired communication port, an optical communication port, or any other wired or wireless unit capable of interfacing with a wired or wireless electronic communication medium 1500.

The electronic communication unit 1320 may be configured to transmit or receive signals via the wired or wireless electronic communication medium 1500, such as via the electronic communication interface 1370. Although not explicitly shown in FIG. 1, the electronic communication unit 1320 is configured to transmit, receive, or both via any wired or wireless communication medium, such as radio frequency (RF), ultraviolet (UV), visible light, fiber optic, wire line, or a combination thereof. Although FIG. 1 shows a single one of the electronic communication unit 1320 and a single one of the electronic communication interface 1370, any number of communication units and any number of communication interfaces may be used. In some embodiments, the electronic communication unit 1320 can include a dedicated short-range communications (DSRC) unit, a wireless safety unit (WSU), IEEE 802.11p (WiFi-P), a cellular communication unit such as a long-term evolution (LTE) or 5G transceiver, or a combination thereof.

The location unit 1310 may determine geolocation information, including but not limited to longitude, latitude, elevation, direction of travel, or speed, of the vehicle 1050. For example, the location unit includes a global navigation satellite system (GNSS) unit (e.g., a global positioning system (GPS) unit), a wide area augmentation system (WAAS) enabled National Marine-Electronics Association (NMEA) unit, a radio triangulation unit, or a combination thereof. The location unit 1310 can be used to obtain information that represents, for example, a current heading of the vehicle 1050, a current position of the vehicle 1050 in two or three dimensions, a current angular orientation of the vehicle 1050, or a combination thereof.

The user interface 1350 may include any unit capable of being used as an interface by a person, including any of a virtual keypad, a physical keypad, a touchpad, a display, a touchscreen, a speaker, a microphone, a video camera, a sensor, and a printer. The user interface 1350 may be operatively coupled with the processor 1330, as shown, or with any other element of the controller 1300. Although shown as a single unit, the user interface 1350 can include one or more physical units. For example, the user interface 1350 includes an audio interface for performing audio communication with a person, and a touch display for performing visual and touch based communication with the person.

The sensor 1360 may include one or more sensors, such as an array of sensors, which may be operable to provide information that may be used to control the vehicle. The sensor 1360 can provide information regarding current operating characteristics of the vehicle or its surrounding. The sensors 1360 include, for example, a speed sensor, acceleration sensors, a steering angle sensor, traction-related sensors, braking-related sensors, or any sensor, or combination of sensors, that is operable to report information regarding some aspect of the current dynamic situation of the vehicle 1050.

In some embodiments, the sensor 1360 may include sensors that are operable to obtain information regarding the physical environment surrounding the vehicle 1050. For example, one or more sensors detect road geometry and obstacles, such as fixed obstacles, vehicles, cyclists, and pedestrians. In some embodiments, the sensor 1360 can be or include one or more video cameras, laser-sensing systems, infrared-sensing systems, acoustic-sensing systems, or any other suitable type of on-vehicle environmental sensing device, or combination of devices, now known or later developed. In some embodiments, the sensor 1360 and the location unit 1310 are combined.

Although not shown separately, the vehicle 1050 may include a trajectory controller. For example, the controller 1300 may include a trajectory controller. The trajectory controller may be operable to obtain information describing a current state of the vehicle 1050 and a route planned for the vehicle 1050, and, based on this information, to determine and optimize a trajectory for the vehicle 1050. In some embodiments, the trajectory controller outputs signals operable to control the vehicle 1050 such that the vehicle 1050 follows the trajectory that is determined by the trajectory controller. For example, the output of the trajectory controller can be an optimized trajectory that may be supplied to the powertrain 1200, the wheels 1400/1410/1420/1430, or both. In some embodiments, the optimized trajectory can control inputs such as a set of steering angles, with each steering angle corresponding to a point in time or a position. In some embodiments, the optimized trajectory can be one or more paths, lines, curves, or a combination thereof.

One or more of the wheels 1400/1410/1420/1430 may be a steered wheel, which is pivoted to a steering angle under control of the steering unit 1230, a propelled wheel, which is torqued to propel the vehicle 1050 under control of the transmission 1220, or a steered and propelled wheel that steers and propels the vehicle 1050.

A vehicle may include units, or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

Figure 2:
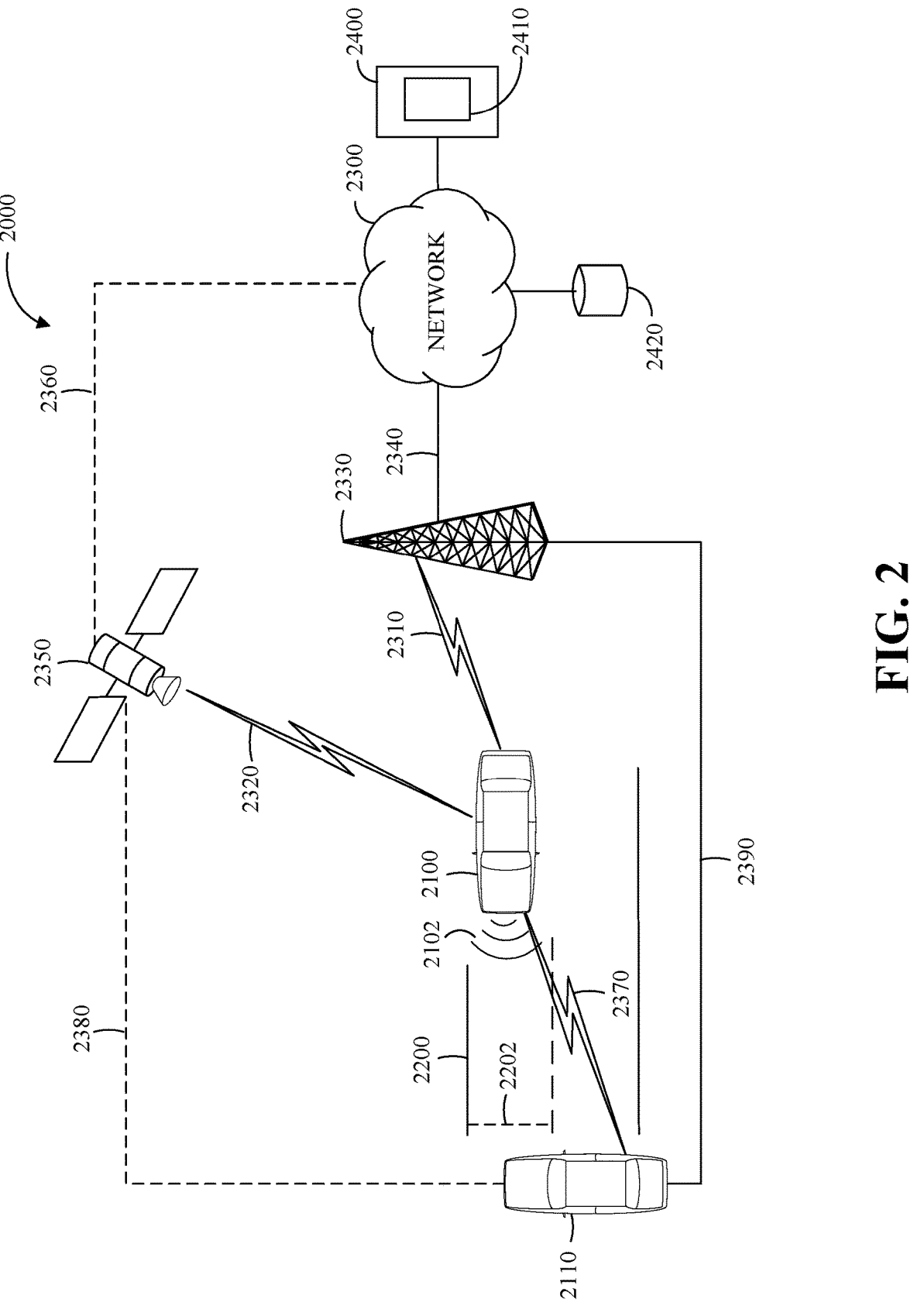
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system 2000 in which the aspects, features, and elements disclosed herein may be implemented. The vehicle transportation and communication system 2000 includes a vehicle 2100, such as the vehicle 1050 shown in FIG. 1, and one or more external objects, such as an external object 2110, which can include any form of transportation, such as the vehicle 1050 shown in FIG. 1, a pedestrian, cyclist, as well as any form of a structure, such as a building. The vehicle 2100 may travel via one or more portions of a transportation network 2200, and may communicate with the external object 2110 via one or more of an electronic communication network 2300. Although not explicitly shown in FIG. 2, a vehicle may traverse an area that is not expressly or completely included in a transportation network, such as an off-road area. In some embodiments the transportation network 2200 may include one or more of a vehicle detection sensor 2202, such as an inductive loop sensor, which may be used to detect the movement of vehicles on the transportation network 2200.

The electronic communication network 2300 may be a multiple-access system that provides for communication, such as voice communication, data communication, video communication, messaging communication, or a combination thereof, between the vehicle 2100, the external object 2110, and a data-processing center 2400. For example, the vehicle 2100 or the external object 2110 may send information to, or receive information from, the data-processing center 2400 or a database server 2420, via the electronic communication network 2300, such as information representing the transportation network 2200. The data-processing center 2400 includes a computing apparatus 2410, that includes some or all of the features of the computing device 3000 shown in FIG. 3. In some implementations, the data-processing center 2400 includes the database server 2420. The database server 2420 is configured for storing data, and it may be implemented by a suitable computer storage medium.

The data-processing center 2400 can monitor and coordinate the movement of vehicles, including autonomous vehicles. The data-processing center 2400 may monitor the state or condition of vehicles, such as the vehicle 2100, and external objects, such as the external object 2110. The data-processing center 2400 can receive vehicle data and infrastructure data including any of: vehicle velocity;

vehicle location; vehicle operational state; vehicle destination; vehicle route; vehicle sensor data; external object velocity; external object location; external object operational state; external object destination; external object route; and external object sensor data.

Further, the data-processing center 2400 can establish remote control over one or more vehicles, such as the vehicle 2100, or external objects, such as the external object 2110. In this way, the data-processing center 2400 may tele-operate the vehicles or external objects from a remote location. The computing apparatus 2410 may exchange (send or receive) state data with vehicles, external objects, or computing devices such as the vehicle 2100, the external object 2110, or the database server 2420, via a wireless communication link such as the wireless communication link 2380 or a wired communication link such as the wired communication link 2390.

In some embodiments, the vehicle 2100 or the external object 2110 communicates via the wired communication link 2390, a wireless communication link 2310/2320/2370, or a combination of any number or types of wired or wireless communication links. For example, as shown, the vehicle 2100 or the external object 2110 communicates via a terrestrial wireless communication link 2310, via a non-terrestrial wireless communication link 2320, or via a combination thereof. In some implementations, a terrestrial wireless communication link 2310 includes an Ethernet link, a serial link, a Bluetooth link, an infrared (IR) link, an ultraviolet (UV) link, or any link capable of providing for electronic communication.

A vehicle, such as the vehicle 2100, or an external object, such as the external object 2110, may communicate with another vehicle, external object, or the data-processing center 2400. For example, a host, or subject, vehicle 2100 may receive one or more automated inter-vehicle messages, such as a basic safety message (BSM), from the data-processing center 2400, via a direct communication link 2370, or via an electronic communication network 2300. For example, data-processing center 2400 may broadcast the message to host vehicles within a defined broadcast range, such as three hundred meters, or to a defined geographical area. In some embodiments, the vehicle 2100 receives a message via a third party, such as a signal repeater (not shown) or another remote vehicle (not shown). In some embodiments, the vehicle 2100 or the external object 2110 transmits one or more automated inter-vehicle messages periodically based on a defined interval, such as one hundred milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system state data, throttle information, steering wheel angle information, or vehicle routing information, or vehicle operating state information, such as vehicle size information, headlight state information, turn signal information, wiper state data, transmission information, or any other information, or combination of information, relevant to the transmitting vehicle state. For example, transmission state information indicates whether the transmission of the transmitting vehicle is in a neutral state, a parked state, a forward state, or a reverse state.

In some embodiments, the vehicle 2100 communicates with the electronic communication network 2300 via an access point 2330. The access point 2330, which may include a computing device, may be configured to communicate with the vehicle 2100, with the electronic communication network 2300, with the data-processing center 2400, or with a combination thereof via wired or wireless communication links 2310/2340. For example, an access point 2330 is a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit, an access point can include any number of interconnected elements.

The vehicle 2100 may communicate with the electronic communication network 2300 via a satellite 2350, or other non-terrestrial communication device. The satellite 2350, which may include a computing device, may be configured to communicate with the vehicle 2100, with the electronic communication network 2300, with the data-processing center 2400, or with a combination thereof via one or more communication links 2320/2360. Although shown as a single unit, a satellite can include any number of interconnected elements.

The electronic communication network 2300 may be any type of network configured to provide for voice, data, or any other type of electronic communication. For example, the electronic communication network 2300 includes a local area network (LAN), a wide area network (WAN), a virtual private network (VPN), a mobile or cellular telephone network, the Internet, or any other electronic communication system. The electronic communication network 2300 may use a communication protocol, such as the transmission control protocol (TCP), the user datagram protocol (UDP), the internet protocol (IP), the real-time transport protocol (RTP) the Hyper Text Transport Protocol (HTTP), or a combination thereof. Although shown as a single unit, an electronic communication network can include any number of interconnected elements.

In some embodiments, the vehicle 2100 communicates with the data-processing center 2400 via the electronic communication network 2300, access point 2330, or satellite 2350. The data-processing center 2400 may include one or more computing devices, which are able to exchange (send or receive) data from: vehicles such as the vehicle 2100; external objects including the external object 2110; or storage devices such as the database server 2420.

In some embodiments, the vehicle 2100 identifies a portion or condition of the transportation network 2200. For example, the vehicle 2100 may include one or more on-vehicle sensors 2102, such as the sensor 1360 shown in FIG. 1, which includes a speed sensor, a wheel speed sensor, a camera, a gyroscope, an optical sensor, a laser sensor, a radar sensor, a sonic sensor (e.g., a microphone or acoustic sensor), a compass, or any other sensor or device or combination thereof capable of determining or identifying a portion or condition of the transportation network 2200.

The vehicle 2100 may traverse one or more portions of the transportation network 2200 using information communicated via the electronic communication network 2300, such as information representing the transportation network 2200, information identified by one or more on-vehicle sensors 2102, or a combination thereof. The external object 2110 may be capable of all or some of the communications and actions described above with respect to the vehicle 2100.

For simplicity, FIG. 2 shows the vehicle 2100 as the host vehicle, the external object 2110, the transportation network 2200, the electronic communication network 2300, and the data-processing center 2400. However, any number of vehicles, networks, or computing devices may be used. In some embodiments, the vehicle transportation and communication system 2000 includes devices, units, or elements not shown in FIG. 2. Although the vehicle 2100 or external object 2110 is shown as a single unit, a vehicle can include any number of interconnected elements.

Although the vehicle 2100 is shown communicating with the data-processing center 2400 via the electronic communication network 2300, the vehicle 2100 (and external object 2110) may communicate with the data-processing center 2400 via any number of direct or indirect communication links. For example, the vehicle 2100 or external object 2110 may communicate with the data-processing center 2400 via a direct communication link, such as a Bluetooth communication link. Although, for simplicity, FIG. 2 shows one of the transportation network 2200, and one of the electronic communication network 2300, any number of networks or communication devices may be used. The vehicle 2100 (and external object 2110) can be monitored or coordinated by the data-processing center 2400, can be operated autonomously or by a human driver, and can exchange (send and receive) vehicle data relating to the state or condition of the vehicle and its surroundings including any of vehicle velocity (e.g., vehicle speed and vehicle trajectory, or heading); vehicle location; vehicle operational state; vehicle destination; vehicle route; vehicle sensor data; external object velocity; external object location, and so on.

Figure 3:
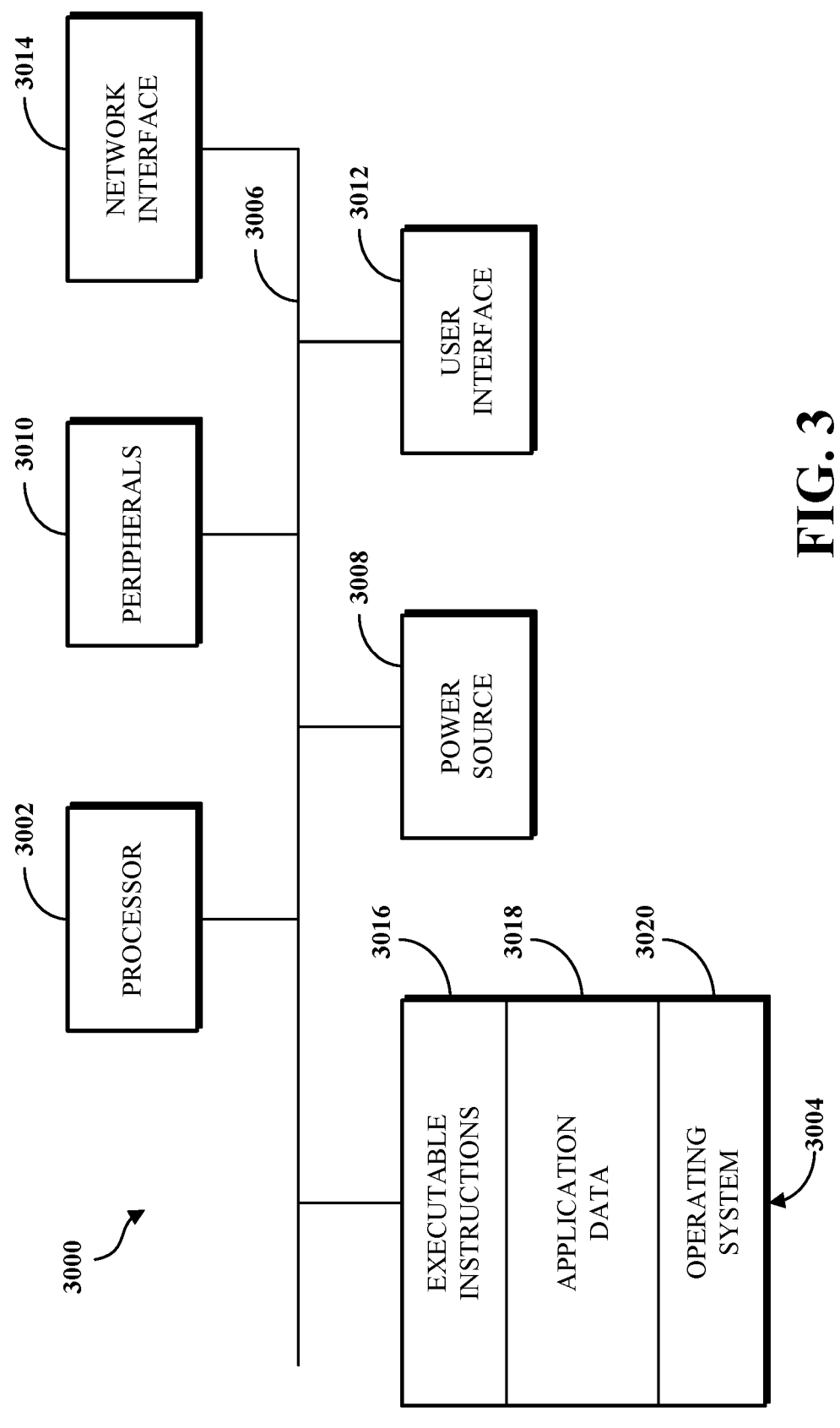
FIG. 3 is a block diagram of an example internal configuration of a computing device of an electronic computing and communications system in which the aspects, features, and elements disclosed herein may be implemented.

FIG. 3 shows a block diagram of an example of a computing device 3000 capable of performing functions described later herein. The computing device 3000 includes components or units, such as a processor 3002, a memory 3004, a bus 3006, a power source 3008, peripherals 3010, a user interface 3012, a network interface 3014, other suitable components, or a combination thereof. One or more of the memory 3004, the power source 3008, the peripherals 3010, the user interface 3012, or the network interface 3014 can communicate with the processor 3002 via the bus 3006.

The processor 3002 is a central processing unit, such as a microprocessor, and can include single or multiple processors having single or multiple processing cores. Alternatively, the processor 3002 can include another type of device, or multiple devices, configured for manipulating or processing information. For example, the processor 3002 can include multiple processors interconnected in one or more manners, including hardwired or networked. The operations of the processor 3002 can be distributed across multiple devices or units that can be coupled directly or across a local area or other suitable type of network. The processor 3002 can include a cache, or cache memory, for local storage of operating data or instructions.

The memory 3004 includes one or more memory components, which may each be volatile memory or non-volatile memory. For example, the volatile memory can be random access memory (RAM) (e.g., a DRAM module, such as DDR SDRAM). In another example, the non-volatile memory of the memory 3004 can be a disk drive, a solid state drive, flash memory, or phase-change memory. In some implementations, the memory 3004 can be distributed across multiple devices. For example, the memory 3004 can include network-based memory or memory in multiple clients or servers performing the operations of those multiple devices.

The memory 3004 can include data for immediate access by the processor 3002. For example, the memory 3004 can include executable instructions 3016, application data 3018, and an operating system 3020. The executable instructions 3016 can include one or more application programs, which can be loaded or copied, in whole or in part, from non-volatile memory to volatile memory to be executed by the processor 3002. For example, the executable instructions 3016 can include instructions for performing techniques of this disclosure. In some implementations, the application data 3018 can include functional programs, such as a computational programs, analytical programs, database programs, and so on. The operating system 3020 can be, for example, Microsoft Windows®, Mac OS X®, or Linux®; an operating system for a mobile device, such as a smartphone or tablet device; or an operating system for a non-mobile device, such as a mainframe computer.

The power source 3008 provides power to the computing device 3000. For example, the power source 3008 can be an interface to an external power distribution system. In another example, the power source 3008 can be a battery, such as where the computing device 3000 is a mobile device or is otherwise configured to operate independently of an external power distribution system. In some implementations, the computing device 3000 may include or otherwise use multiple power sources. In some such implementations, the power source 3008 can be a backup battery.

The peripherals 3010 may include one or more sensors, detectors, or other devices configured for monitoring the computing device 3000 or the environment around the computing device 3000. For example, the peripherals 3010 can include a geolocation component, such as a GNSS location unit (e.g., GPS). In another example, the peripherals can include a temperature sensor for measuring temperatures of components of the computing device 3000, such as the processor 3002. In some implementations, the computing device 3000 can omit the peripherals 3010.

The user interface 3012 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 3014 provides a connection or link to a network (e.g., the electronic communication network 2300 shown in FIG. 2). The network interface 3014 can be a wired network interface or a wireless network interface. The computing device 3000 can communicate with other devices via the network interface 3014 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof. For example, the computing device 3000 can communicate with a database server, such as the database server 2420 of FIG. 2.

In the description herein, sentences describing the autonomous vehicle as taking an action (such as performing, determining, initiating, receiving, calculating, deciding, etc.) are to be understood that some appropriate module of the AV as taking the action. Such modules may be stored in a memory of the AV, such as the memory 1340 of FIG. 1, and executed by a processor, such as the processor 1330 of FIG. 1. Such modules may be partially or fully included in a controller apparatus, such as the computing apparatus 2410 of FIG. 2 and may be partially or fully executed by a processor of the AV, a processor of a data-processing center, or a combination thereof. For example, the statement "the AV determines a trajectory" can be understood to mean that "a module of the AV determines a trajectory" or "a trajectory planning module of the AV determines a trajectory."

Figure 4:
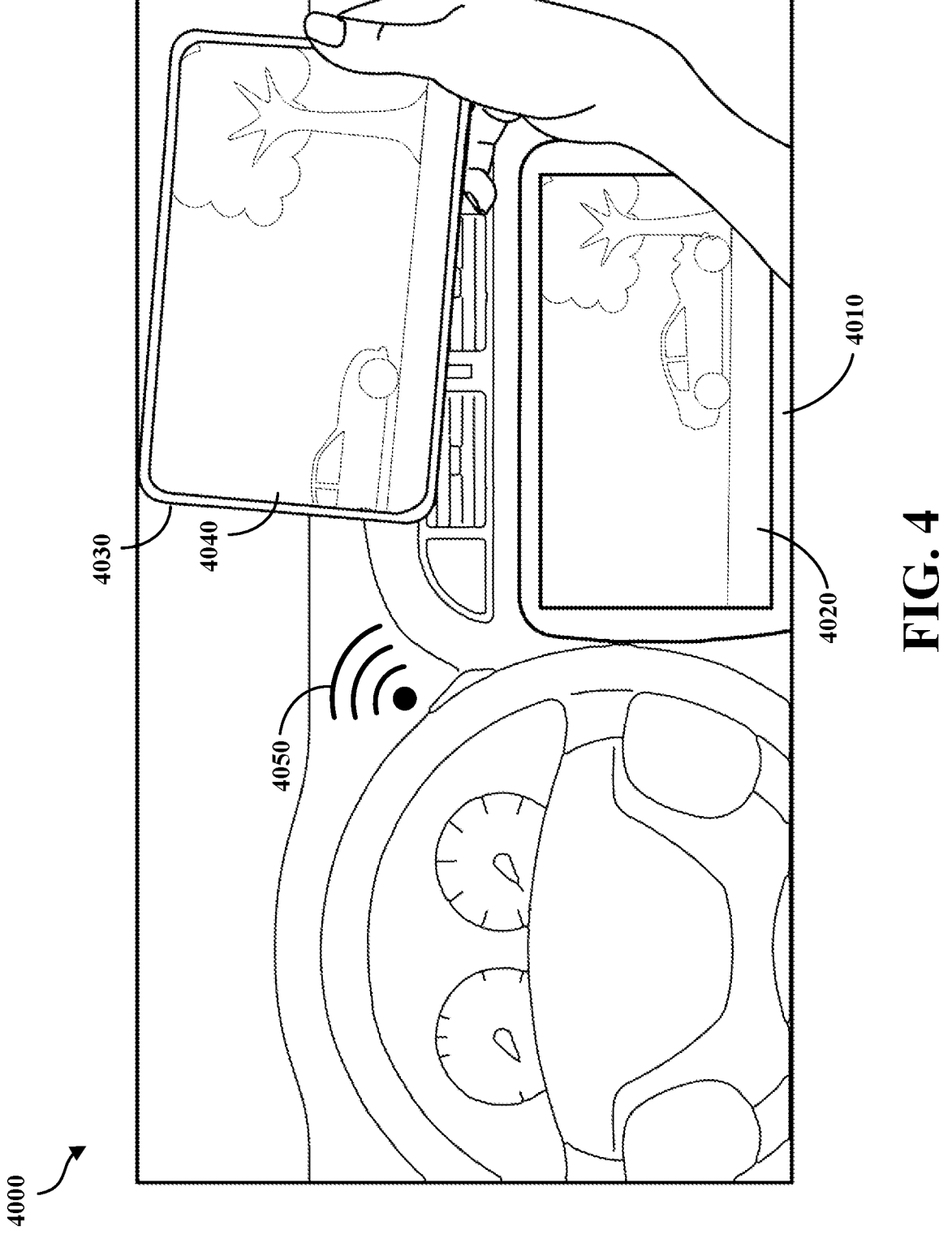
FIG. 4 is a diagram of an example of a system depicting latency between an in-vehicle graphical display and a mobile device's graphical display.

FIG. 4 is an example of a system 4000 that includes an in-vehicle infotainment (IVI) system 4010 (shown generally) comprising a graphical display 4020 and a mobile device 4030 comprising a graphical display 4040. The IVI system 4010 and the mobile device 4030 may each be implemented by a respective computing device, such as the computing device 3000 of FIG. 3. The graphical display 4020 of the IVI system 4010 and the graphical display 4040 of the mobile device 4030 may each be implemented by a respective user interface, such as the user interface 3012 of FIG. 3. The IVI system 4010 and the mobile device 4030 may be communicatively coupled via a network 4050, for example a wireless network such as a Wi-Fi network, which may be accessed via respective network interfaces, such as the network interface 3014 of FIG. 3.

In FIG. 4, both the graphical display 4020 of the IVI system 4010 and the graphical display 4040 of the mobile device 4030 display a same multimedia video content that is served by the IVI system 4010. In some implementations, the graphical display 4020 displays the multimedia content having been received via a wired connection while the graphical display 4040 displays the multimedia content having been received via a wireless connection, e.g., via the network 4050. FIG. 4 depicts a situation where playback via the graphical display 4020 is out of synchronization with playback via the graphical display 4040 due to various delays, or latencies, such as one or more of: (1) delay in a transmission of the multimedia content from the IVI system 4010 to the mobile device 4030 via the network 4050; (2) delay in a reception of the multimedia content by the mobile device 4030; (3) delay in a processing of the multimedia content by the mobile device 4030; (4) delay in presenting the multimedia content via the graphical display 4040. FIG. 4 shows a typical case where playback of the multimedia content by the mobile device 4030 lags playback of the multimedia content by the IVI system 4010. Although less common, playback of the multimedia content by the IVI system 4010 could lag playback of the multimedia content by the mobile device 4030, depending on specific hardware and software configurations of the IVI system 4010 and the mobile device 4030 and communication channels and protocols utilized for sending and receiving the multimedia content (e.g., electrical, optical, wireless, etc.).

Figure 5:
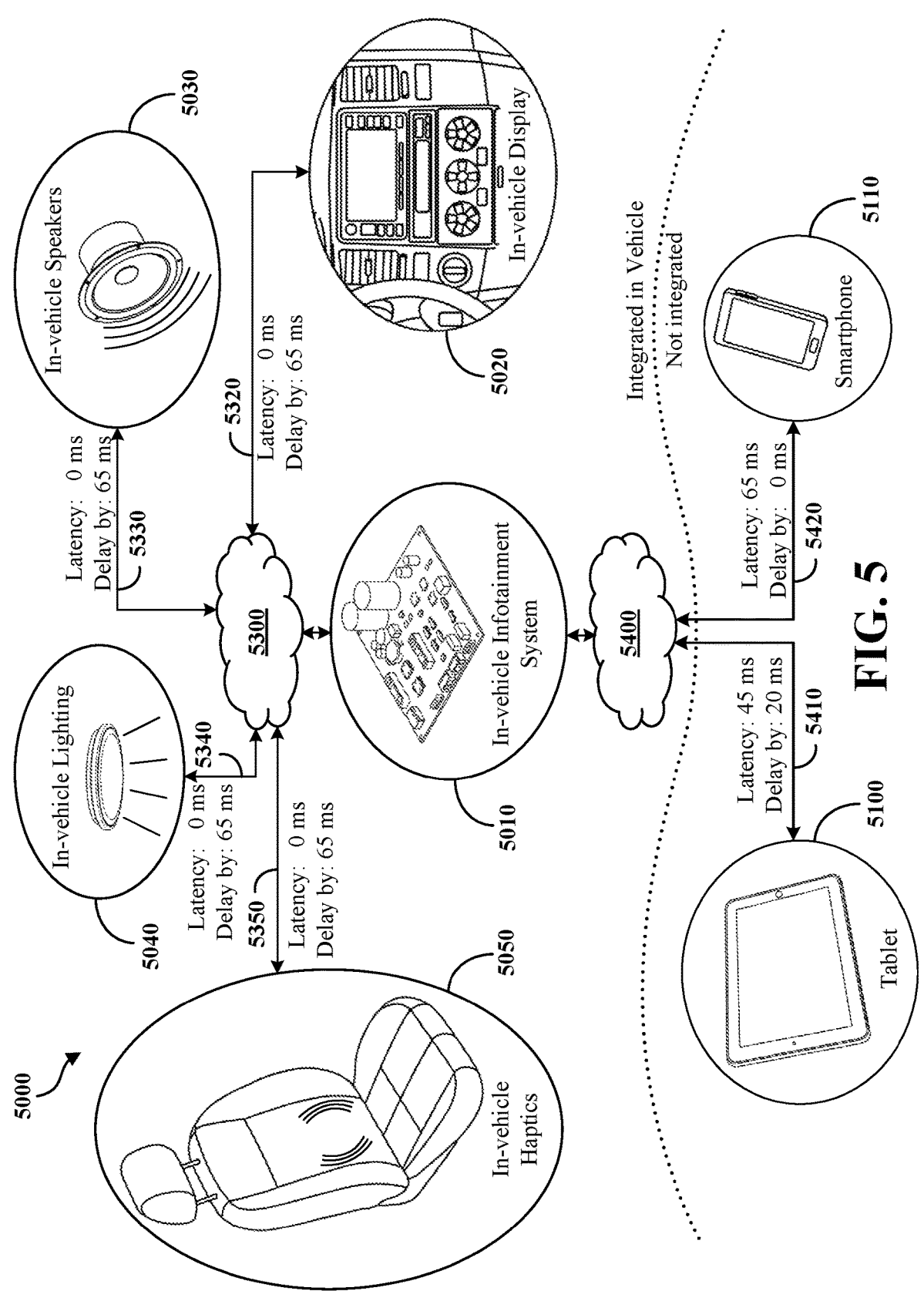
FIG. 5 is a diagram of an example of an in-vehicle infotainment system, comprising integrated playback devices, that is in communication with several mobile devices having various latencies with respect to the in-vehicle infotainment system.

FIG. 5 shows an example of a system 5000 that includes an IVI system 5010 that is connected via a network 5300 to several playback devices integrated into the vehicle and connected via a network 5400 to several mobile devices. The IVI system 5010 may function as a primary device and may be the IVI system 4010 of FIG. 4. Each mobile device may function as a secondary device, where the tablet 5100 and the smartphone 5110 may be instances of the mobile device 4030 of FIG. 4. The network 5300, that connects the IVI system 5010 to the several playback devices integrated into the vehicle, may be implemented by one or more communication channels suitable for intra-vehicle communication between integrated devices or components of the vehicle, such as Car Area Network (CAN) buses and dedicated point-to-point links. The network 5400, that connects the IVI system 5010 to the tablet 5100 and the smartphone 5110, may be implemented by one or more communication channels suitable for intra-vehicle communication between mobile devices or components not integrated into the vehicle, such as Wi-Fi, Bluetooth, or ZigBee).

The several playback devices integrated into the vehicle include: an in-vehicle display 5020 for displaying multimedia graphical information; an in-vehicle speaker (or speaker system) 5030 for outputting multimedia audio information; an in-vehicle lighting system 5040 for adjusting cabin lighting according to multimedia ambiance information; an in-vehicle haptics system 5050 for outputting forces and vibrations from a car seat or a steering wheel or other physical components according to multimedia tactile information; and other playback devices not shown in FIG. 5. Each of these integrated playback devices may be implemented by an instance of the user interface 3012 of FIG. 3.

Because the integrated playback devices are typically built into the vehicle by a vehicle manufacturer, their various properties can be accounted for when designing the IVI system 5010, thereby ensuring tight synchronization between multimedia playback by these integrated devices. For example, if the IVI system 5010 is serving an action movie, the in-vehicle display 5020 may show an explosion at the same time the in-vehicle speakers 5030 play a loud noise, at the same time lights of the in-vehicle lighting system 5040 flickers, and at the same time the in-vehicle haptics 5050 causes a car seat to vibrate. However, it is more difficult for the vehicle manufacturer to account for various properties of the mobile devices, e.g., the tablet 5100 and the smartphone 5110, that are not integrated into the vehicle. For example, the capabilities and real-time performance of mobile devices can vary widely due to their brand, age, chipset, operating system, available memory, current workload, and so on. Thus, each mobile device, e.g., the tablet 5100 and the smartphone 5110, may process information received from the IVI system 5010 at different speeds, resulting in varying delays in multimedia playback, such as displaying video later than the same video is displayed by an integrated playback device such as the in-vehicle display 5020. This can result in out-of-synchronization playback between the integrated playback devices and the non-integrated playback devices.

FIG. 5 depicts example latencies of the various playback devices. For simplicity, each of the integrated playback devices has a latency of 0 ms, meaning that synchronization of these integrated playback devices with the IVI system 5010 has been managed (e.g., accounted for) by the vehicle manufacturer (and or various device and component manufacturers). The latency of the tablet 5100 is 45 ms, meaning 45 ms elapse between sending multimedia information from the IVI system 5010 to the tablet 5100 and playback of the multimedia information by the tablet 5100. Similarly, the latency of the smartphone is 65 ms, meaning 65 ms elapse between sending of multimedia information from the IVI system 5010 to the smartphone 5110 and playback of the multimedia information by the smartphone 5110. These values are by way of example only. For all playback devices to by synchronized, i.e., for their respective playback of multimedia information to occur substantially simultaneously, an extra delay must be added to each of the faster playback devices. The extra delay is a function of the maximum latency in the system 5000, in this case 65 ms. Specifically, the extra delay to add to each playback device equals the maximum latency of the system 5000 minus the latency of the respective playback device. For example, the extra delay that the IVI system 5010 must add to the integrated playback devices is 65 ms–0 ms=65 ms. The extra delay that the IVI system 5010 must add to the tablet 5410 is 65 ms–45 ms=20 ms. The extra delay that the IVI system 5010 must add to the smartphone 5110 is 65 ms–65 ms=0 ms.

In some implementations, the IVI system 5010 may effectuate the extra delays via (output) buffers local to the IVI system 5010. For example, in FIG. 5, where it has been determined that the integrated playback devices require a 65 ms extra delay, the tablet 5100 requires a 20 ms extra delay, and the smartphone 5110 requires a 0 ms extra delay, the IVI system 5010 would send respective multimedia messages to each of these playback devices after each appropriate extra delay.

In some implementations, the IVI system 5010 may effectuate the extra delays via (input) buffers local to the respective playback devices. For example, in FIG. 5, where it has been determined that the integrated playback devices require a 65 ms extra delay, the tablet 5100 requires a 20 ms extra delay, and the smartphone 5110 requires a 0 ms extra delay, the IVI system 5010 would send respective multimedia messages to each of these playback devices at the same (or nearly the same) time, with an instruction to each playback device to delay playback of the multimedia information by the appropriate extra delay.

In some implementations, the IVI system 5010 may effectuate the extra delays via a combination of buffers local to the IVI system 5010 and buffers local to the respective playback devices.

Figure 6:
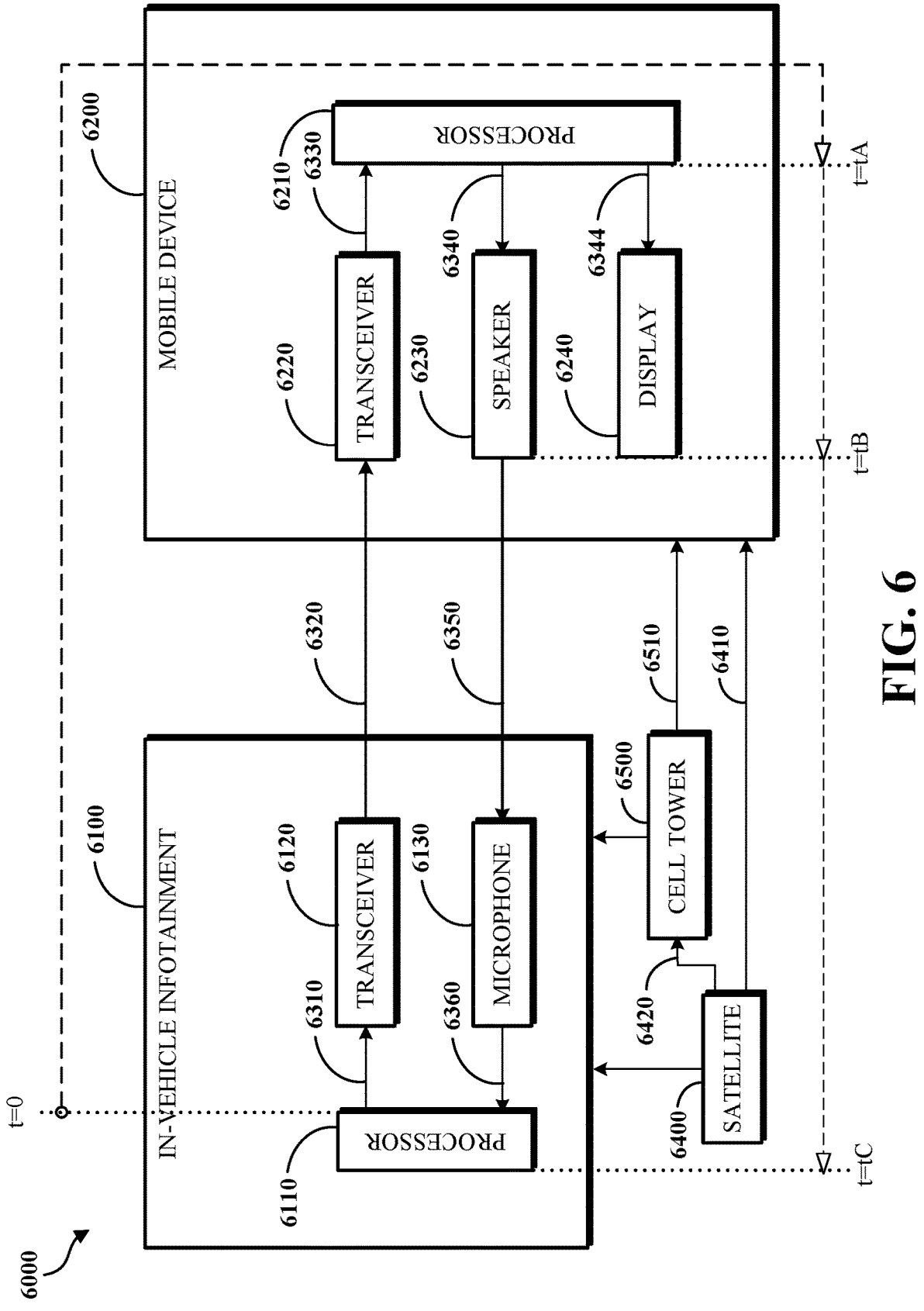
FIG. 6 is an example of determining a latency of a mobile device in communication with an in-vehicle infotainment system.

FIG. 6 shows an example of a system 6000 for determining a latency of a mobile device 6200 communicatively coupled to an IVI system 6100. The mobile device 6200 may be one of the tablet 5100 or the smartphone 5110 of FIG. 5 and the IVI system 6100 may be the IVI system 5010 of FIG. 5. The communicative coupling between the IVI system 6100 and the mobile device 6200 may be via a network, such as the network 5400 of FIG. 5, as well as other communication channels, such as open air through which sound signals and optical signals may travel. The IVI system 6100 comprises a processor 6110 for computational processing, a transceiver 6120 for sending and/or receiving messages, and a microphone 6130 for receiving sound signals. The mobile device 6200 comprises a processor 6210 for computational processing, a transceiver 6220 for sending and/or receiving messages, a speaker 6230 for outputting sound signals, and a display 6240 for displaying graphical information such as video. The IVI system 6100 and the mobile device 6200 are shown with only certain components that are relevant to following descriptions; the IVI system 6100 and the mobile device 6200 may include other components not shown in FIG. 6. As indicated in FIG. 6, at time t=0, the processor 6110 of the IVI system 6100 passes data to the transceiver 6120, via a connection 6310, to be sent to the mobile device 6200.

In some implementations, the data passed to the transceiver 6120 by the processor 6110 comprises an instruction for the mobile device 6200 to output an audio signal via its speaker 6230. In some implementations, the data further comprises an encoded audio signal, for example, audio information that is decodable by the mobile device 6200. In other implementations, audio information may be sent to the mobile device in a separate message, or the audio information may be preconfigured in the mobile device 6200. The transceiver 6120 packetizes the data into a message (e.g., a datagram such as a frame or a packet) and sends the message to the transceiver 6220 of the mobile device 6200 via a communication channel 6320, which may be comprised in a network such as the network 5400 of FIG. 5. The transceiver 6220 depacketizes the message and passes the data to the processor 6210 of the mobile device 6200 via a connection 6330. The processor 6210 processes the data, which includes the instruction to output the audio signal via the speaker 6230 (and which may also include the encoded audio signal), and the processor 6210 instructs the speaker 6230, via the connection 6340, to output the audio signal, i.e., to play the sound corresponding to the audio signal. In some implementations, the audio signal may be a narrowband chirp or tone that is easily detected by the microphone 6130, although other audio signals may be similarly effective. The processor 6210 may instruct the speaker 6230 via analog electrical signals for direct reproduction by the speaker 6230, or via digital signals for further decoding and subsequent audio output by the speaker 6230. As indicated in FIG. 6, the speaker 6230 outputs the audio signal at time t=tB, where the dashed line represents a timeline starting at t=0. The microphone 6130 of the IVI system 6100 receives the audio signal via an audio channel 6350, e.g., open air, and passes the received audio signal (as either analog or digital signals) to the processor 6110 of the IVI system 6100 for processing. FIG. 6 indicates that the processor 6110 completes processing of the audio signal at time t=tC, e.g., the processor 6110 detects and recognizes the received audio signal as the audio signal output by the mobile device 6200 as instructed.

In the above-described example, the latency of the mobile device 6200 may be determined to be the time elapsed from t=0 to t=tC, i.e., tC minus to. In most cases, this is a reasonably accurate determination of the playback latency of the mobile device 6200, which is more accurately characterized as the time elapsed from t=t0 to t=tB, where tB is the point in time when the speaker 6230 actually outputs the audio signal. Thus, in some implementations, the IVI system 6100 may account for the overrepresented delays incurred by the microphone 6130 receiving the audio signal and the processor 6110 processing the received audio signal. For example, the IVI system 6100 could be preconfigured with a microphone delay parameter and a processor delay parameter at design time based on the specifications of the microphone 6130 and the processor 6110, which it could subtract from the difference tC minus to.

Determining the latency of the mobile device 6200 using an audio signal as described above presumes that latency of processing received audio information and latency of processing received video information by the mobile device 6200 are substantially equal. In some implementations, if a speed of processing of received audio information by the mobile device 6200 is noticeably different from a speed of processing of received video information by the mobile device 6200, then the message sent by the IVI system 6100 could include an instruction to playback audio information and video information, and the message could include an encoded audiovisual signal, for example, audiovisual information that is decodable by the mobile device 6200. Because audio playback and video playback of audiovisual information are expected to be substantially synchronized within the mobile device 6200, detecting the playback of the audio signal output by the speaker 6230 via the microphone 6130 enables a reasonably accurate determination the audiovisual latency of the mobile device 6200.

In some implementations, the IVI system 6100 periodically or intermittently sends a message to the mobile device comprising an instruction to output the audio signal via the speaker 6230, so that the IVI system 6100 may redetermine the latency of the mobile device 6200. A period or interval between instructions may be fixed or based on suitable parameters, such as the size of the latency. In some implementations, the instruction to output the audio signal may be intentionally provided during playback of other audio information by the mobile device 6200, such that the audio signal may be difficult or impossible for a human to detect, yet still detectable by the microphone 6130. In some implementations, instead of utilizing a discrete audio signal, the IVI system 6100 may determine the latency of the mobile device 6200 via continuous (or semi-continuous) audio information (e.g., that which may be comprised in multimedia content) that is served to the mobile device 6200 by the IVI system 6100 and subsequently played back by the mobile device 6200.

In some implementations the IVI system 6100 could detect, via a camera of the IVI system 6100 (not shown in FIG. 6), playback of video information displayed by the display 6240 of the mobile device 6200, and determine the latency of the mobile device 6200 based on the elapsed time from when the mobile device 6200 was instructed to display the video information to when the processor 6110 determined the camera began receiving the displayed video information.

In some implementations, the data passed to the transceiver 6120 by the processor 6110 comprises an instruction for the mobile device 6200 to record a time, e.g., a timestamp, at which the mobile device 6200 displays certain graphical information (e.g., video information) via the display 6240. In some implementations, the data further comprises an encoded video signal, for example, video information that is decodable by the mobile device 6200. In other implementations, video information may be sent to the mobile device in a separate message, or the video information may be preconfigured in the mobile device 6200. The transceiver 6120 packetizes the data into a message (e.g., a datagram such as a frame or a packet) and sends the message to the transceiver 6220 of the mobile device 6200 via a communication channel 6320, which may be comprised in a network such as the network 5400 of FIG. 5. The transceiver 6220 depacketizes the message and passes the data to the processor 6210 of the mobile device 6200 via a connection 6330. The processor 6210 processes the data, which includes the instruction to record a time, e.g., a timestamp, at which the processor instructs the display 6240 to display, the video information comprised in the message. The processor 6210 passes the video information to the display 6240 via the connection 6344. The mobile device 6200 sends a response message back to the IVI system 6100 comprising the timestamp, for example, time t=tA at which the processor 6210 instructed the display 6240 to display the video information, or time t=tB that corresponds to a time at which the mobile device 6200 (e.g., the processor 6210 of the mobile device 6200) estimates that the display 6240 actually displayed the video information (i.e., accounting for any delay of the display 6240).

The IVI system 6100 receives the response message comprising the timestamp, t=tA or t=tB, from the mobile device 6200, and compares that timestamp to the time, t=t0 at which the IVI system 6100 sent the initial message with the instruction to the mobile device 6200, e.g., the processor 6110 computes a difference tA minus t0 or tB minus t0, for whichever timestamp corresponds to the instruction sent by the IVI system 6100, to determine the latency of the mobile device 6200. In some implementations, the mobile device 6200 and/or the IVI system 6100 may account for underrepresented delays, such as a delay of the display 6240 if the timestamp corresponds to t=tA, and/or overrepresented delays, such as a delay of the transceiver 6120 to receive the response message from the mobile device 6200 and a delay of the processor 6110 to process the received timestamp.

Determining the latency of the mobile device 6200 using timestamps as described above relies on the IVI system 6100 and the mobile device 6200 having an a priori synchronized notion of time. Thus, the IVI system 6100 and the mobile device 6200 may utilize precise atomic clock information based on satellite transmissions, such as GNSS signals. In some implementations, the IVI system 6100 and/or the mobile device 6200 may directly receive satellite transmissions from several satellites, represented as satellite 6400 in FIG. 6. In some implementations, the IVI system 6100 and/or the mobile device 6200 may receive precise atomic clock information from one or more cellular towers or other terrestrial devices that have directly received satellite transmissions from several satellites, represented as cell tower 6500 in FIG. 6. In some implementations, the IVI system 6100 and/or the mobile device 6200 utilizes the Network Time Protocol (NTP).

For simplicity of explanation, each technique, or process, is depicted and described herein as a series of steps or operations. However, the steps or operations of the techniques in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The techniques 7000, 8000, and 9000 described below are techniques for synchronizing playback of multimedia information between in-vehicle devices of an IVI system and one or more mobile devices. These techniques may be implemented by an IVI system, such as the IVI system 6100 of FIG. 6, that sends messages to one or more mobile devices, such as the mobile device 6200 of FIG. 6, and receives one or more respective responses therefrom.

FIG. 7 is a flowchart of an example of a technique 7000 for determining a latency of a mobile device with respect to an in-vehicle infotainment system and utilizing the latency to synchronize playback of multimedia information.

The step 7010 comprises sending a first message from a primary device to a first secondary device. In some implementations, the primary device may be the IVI system 6100 of FIG. 6 and the secondary device may be the mobile device 6200 of FIG. 6. In some implementations, the first message is sent via a wireless network, such as a wireless network (e.g., Wi-Fi) implemented by network 5400 of FIG. 5. In some implementations, the first message is sent via a transceiver, such as the transceiver 6120 of FIG. 6, and the first message is received by a transceiver, such as the transceiver 6220 of FIG. 6.

The step 7020 comprises receiving a first response from the first secondary device at the primary device. The example techniques 8000 and 9000, described below, provide further details on the response and the receiving of the response.

The step 7030 comprises determining a first duration based on the first message and the first response. In some implementations, determining the first duration is performed by a processor, such as the processor 6110 of FIG. 6. The example techniques 8000 and 9000, described below, provide further details on determining the first duration.

The step 7040 comprises sending, at a start time, a first multimedia message comprising first multimedia graphical information from the primary device to the first secondary device for displaying via a first graphical display of the first secondary device. In some implementations, the first graphical display is the display 6240 in FIG. 6.

The step 7050 comprises displaying, at a time substantially equal to the start time plus the first duration, the first multimedia graphical information via a graphical display of the primary device. In some implementations, the graphical display of the primary device is the in-vehicle display 5020 of FIG. 5.

FIG. 8 is a flowchart of an example of a technique 8000 for determining a latency of a secondary device, such as a mobile device, with respect to a primary device, such as an in-vehicle infotainment system, and utilizing the latency to synchronize playback of multimedia information, wherein the latency is based on detecting a sound output by the mobile device.

The step 8010 comprises performing the steps 7010, 7020, 7030, 7040, and 7050 of FIG. 7.

The step 8020 comprises sending the first message comprising an instruction for the first secondary device to output a first audio signal. In some implementations, the first audio signal is to be output via a speaker, such as the speaker 6230 of FIG. 6. In some implementations, the instruction is processed by a processor of the secondary device, such as the processor 6210 of FIG. 6.

The step 8030 comprises receiving the first response at a microphone of the primary device, wherein the first duration is based on a time elapsed from the sending of the first message to the receiving of the first response. In some implementations, the response may be received via an open-air communication channel. In some implementations, a processor of the primary device, such as the processor 6110 of FIG. 6, determines, or computes, the time elapsed.

FIG. 9 is a flowchart of an example of a technique 9000 for determining a latency of a secondary device, such as a mobile device, with respect to a primary device, such as an in-vehicle infotainment system, and utilizing the latency to synchronize playback of multimedia information, wherein the latency is based on recording a satellite-synchronized timestamp.

The step 9010 comprises performing the steps 7010, 7020, 7030, 7040, and 7050 of FIG. 7.

The step 9020 comprises instructing the first secondary device to record a first time at which the first secondary device displays first graphical information, comprised in the first message, via the first graphical display. In some implementations, the first graphical display is the display 6240 of FIG. 6. In some implementations, the instruction is processed by a processor of the mobile device, such as the processor 6210 of FIG. 6.

The step 9030 comprises receiving the first response comprising the first time, wherein the first duration is based on a difference between a time at the sending of the first message and the first time, and the primary device and the first secondary device have independently synchronized their respective clocks to an external reference based on satellite transmissions. In some implementations, the first response is sent via a wireless LAN implemented by the network 5400 of FIG. 5. In some implementations, determining the difference between the time at the sending of the first message and the first time is performed by a processor, such as the processor 6110 of FIG. 6. In some implementations, the primary device and the first secondary device independently synchronize their respective clocks via GNSS signals received directly from various satellites.

The above-described techniques can be implemented as a method, a system, and a non-transitory computer-readable medium.

In an example implementation as a method, the method comprises: sending a first message from a primary device to a first secondary device; receiving a first response from the first secondary device at the primary device; determining a first duration based on the first message and the first response; sending, at a start time, a first multimedia message comprising first multimedia graphical information from the primary device to the first secondary device for displaying via a first graphical display of the first secondary device; and displaying, at a time substantially equal to the start time plus the first duration, the first multimedia graphical information via a graphical display of the primary device.

In some implementations, the method further comprises: sending the first message comprising an instruction for the first secondary device to output a first audio signal; and receiving the first response at a microphone of the primary device; wherein the first duration is based on a time elapsed from the sending of the first message to the receiving of the first response.

In some implementations, the method further comprises: instructing the first secondary device to record a first time at which the first secondary device displays first graphical information, comprised in the first message, via the first graphical display; e first response comprising the first time; wherein the first duration is based on a difference between a time at the sending of the first message and the first time; and the primary device and the first secondary device have independently synchronized their respective clocks to an external reference based on satellite transmissions.

In some implementations, the method further comprises: instructing the first secondary device to record a first time at which the first secondary device outputs first audio information, comprised in the first message, via a first speaker of the first secondary device; and receiving the first response comprising the first time; wherein the first duration is based on a difference between a time at the sending of the first message and the first time; and the primary device and the first secondary device have independently synchronized their respective clocks to an external reference based on satellite transmissions.

In some implementations, the first multimedia message further comprises first multimedia audio information for outputting via a first speaker of the first secondary device; wherein the method further comprises: outputting, at a time substantially equal to the start time plus the first duration, the first multimedia audio information via a speaker of the primary device.

In some implementations, the method further comprises: sending a second message from the primary device to a second secondary device; receiving a second response from the second secondary device at the primary device; determining a second duration based on the second message and the second response; determining that the first duration is greater than the second duration; and sending, at a time substantially equal to the start time plus the first duration minus the second duration, a second multimedia message comprising the first multimedia graphical information from the primary device to the second secondary device for displaying via a second graphical display of the second secondary device.

In some implementations, the first multimedia message further comprises first multimedia audio information for outputting via a first speaker of the first secondary device; and the second multimedia message further comprises the first multimedia audio information for outputting via a first speaker of the second secondary device; wherein the method further comprises: outputting, at a time substantially equal to the start time plus the first duration, the first multimedia audio information via a speaker of the primary device.

In some implementations, the method further comprises: sending a second message from the primary device to a second secondary device; receiving a second response from the second secondary device at the primary device; determining a second duration based on the second message and the second response; and determining that the first duration is greater than the second duration; wherein the sending of the first multimedia message is a broadcast to the first secondary device and the second secondary device, for displaying the first multimedia graphical information via the first graphical display and a second graphical display of the second secondary device, and comprises an instruction to the second secondary device to delay displaying the first multimedia graphical information for a duration substantially equal to the first duration minus the second duration.

In some implementations, the first multimedia message further comprises first multimedia audio information, for outputting via a first speaker of the first secondary device and for outputting via a second speaker of the second secondary device, and an instruction to the second secondary device to delay outputting the first multimedia audio information for a duration substantially equal to the first duration minus the second duration; wherein the method further comprises: outputting, at a time substantially equal to the start time plus the first duration, the first multimedia audio information via a speaker of the primary device.

In some implementations, the primary device is an in-vehicle infotainment system.

In some implementations, the first secondary device and the second secondary device are each mobile devices.

In some implementations, the first message and the first multimedia message are sent via a wireless network.

In some implementations, the first multimedia graphical information comprises at least one of: pre-recorded video information; or live-streaming video information.

In another example implementation as a system, the system comprises one or more memories; and one or more processors configured to execute instructions stored in the one or more memories to: send a first message from a primary device to a first secondary device; receive a first response from the first secondary device at the primary device; determine a first duration based on the first message and the first response; send, at a start time, a first multimedia message comprising first multimedia graphical information from the primary device to the first secondary device for displaying via a first graphical display of the first secondary device; and display, at a time substantially equal to the start time plus the first duration, the first multimedia graphical information via a graphical display of the primary device.

In some implementations, the instructions include instructions to: send the first message comprising an instruction for the first secondary device to output a first audio signal; and receive the first response at a microphone of the primary device; wherein the first duration is based on a time elapsed from the sending of the first message to the receiving of the first response.

In some implementations, the instructions include instructions to: send a second message from the primary device to a second secondary device; receive a second response from the second secondary device at the primary device; determine a second duration based on the second message and the second response; determine that the first duration is greater than the second duration; and send, at a time substantially equal to the start time plus the first duration minus the second duration, a second multimedia message comprising the first multimedia graphical information from the primary device to the second secondary device for displaying via a second graphical display of the second secondary device.

In some implementations, the instructions include instructions to: send a second message from the primary device to a second secondary device; receive a second response from the second secondary device at the primary device; determine a second duration based on the second message and the second response; and determine that the first duration is greater than the second duration; wherein the instruction to send the first multimedia message is an instruction to broadcast the first multimedia message to the first secondary device and the second secondary device, for displaying the first multimedia graphical information via the first graphical display and a second graphical display of the second secondary device; and the first multimedia message comprises an instruction to the second secondary device to delay displaying the first multimedia graphical information for a duration substantially equal to the first duration minus the second duration.

In another example implementation as a non-transitory computer-readable medium, the non-transitory computer-readable medium stores instructions operable to cause one or more processors to perform operations comprising: sending a first message from a primary device to a first secondary device; receiving a first response from the first secondary device at the primary device; determining a first duration based on the first message and the first response; sending, at a start time, a first multimedia message comprising first multimedia graphical information from the primary device to the first secondary device for displaying via a first graphical display of the first secondary device; and displaying, at a time substantially equal to the start time plus the first duration, the first multimedia graphical information via a graphical display of the primary device.

In some implementations, the operations further comprise: sending the first message comprising an instruction for the first secondary device to output a first audio signal; and receiving the first response at a microphone of the primary device; wherein the first duration is based on a time elapsed from the sending of the first message to the receiving of the first response.

In some implementations, the operations further comprise: sending a second message from the primary device to a second secondary device; receiving a second response from the second secondary device at the primary device; determining a second duration based on the second message and the second response; determining that the first duration is greater than the second duration; and sending, at a time substantially equal to the start time plus the first duration minus the second duration, a second multimedia message comprising the first multimedia graphical information from the primary device to the second secondary device for displaying via a second graphical display of the second secondary device.

In some implementations, the operations further comprise: sending a second message from the primary device to a second secondary device; receiving a second response from the second secondary device at the primary device; determining a second duration based on the second message and the second response; and determining that the first duration is greater than the second duration; wherein the sending of the first multimedia message is a broadcast to the first secondary device and the second secondary device, for displaying the first multimedia graphical information via the first graphical display and a second graphical display of the second secondary device; and the first multimedia message comprises an instruction to the second secondary device to delay displaying the first multimedia graphical information for a duration substantially equal to the first duration minus the second duration.

As used herein, the terminology "example," "embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify," or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or". That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

The above-described aspects, examples, and implementations have been described to allow easy understanding of the disclosure are not limiting. On the contrary, the disclosure covers various modifications and equivalent arrangements included within the scope of the appended claims, which scope is to be accorded the broadest interpretation to encompass all such modifications and equivalent structure as is permitted under the law.

What is claimed is:

1. A method, comprising:

sending a first message from a primary device to a first secondary device, comprising first multimedia information and an instruction to record a first time at which the first secondary device outputs the first multimedia information via a first output device of the first secondary device, wherein the primary device and the first secondary device have independently synchronized their respective clocks to an external reference based on global navigation satellite system (GNSS) transmissions;

receiving a first response from the first secondary device at the primary device, the first response comprising the first time;

determining a first duration based on a difference between a time at the sending of the first message and the first time;

sending, at a start time, a first multimedia message comprising first multimedia information from the primary device to the first secondary device for outputting via the first output device; and outputting, at a time substantially equal to the start time plus the first duration, the first multimedia information via an output device of the primary device.

2. The method of claim 1, wherein:
the first multimedia information comprises first graphical information.

3. The method of claim 1, wherein:
the first multimedia information comprises first audio information.

4. The method of claim 1, wherein:
the first multimedia message further comprises first multimedia audio information for outputting via a first speaker of the first secondary device; wherein the method further comprises:

outputting, at a time substantially equal to the start time plus the first duration, the first multimedia audio information via a speaker of the primary device.

5. The method of claim 1, further comprising:
sending a second message from the primary device to a second secondary device;

receiving a second response from the second secondary device at the primary device;

determining a second duration based on the second message and the second response;

determining that the first duration is greater than the second duration; and sending, at a time substantially equal to the start time plus the first duration minus the second duration, a second multimedia message comprising the first multimedia information from the primary device to the second secondary device for outputting via a second output device of the second secondary device.

6. The method of claim 5, wherein:
the first multimedia message further comprises first multimedia audio information for outputting via a first speaker of the first secondary device; and the second multimedia message further comprises the first multimedia audio information for outputting via a first speaker of the second secondary device; wherein the method further comprises:

outputting, at a time substantially equal to the start time plus the first duration, the first multimedia audio information via a speaker of the primary device.

7. The method of claim 1, further comprising:
sending a second message from the primary device to a second secondary device;

receiving a second response from the second secondary device at the primary device;

determining a second duration based on the second message and the second response; and determining that the first duration is greater than the second duration; wherein the sending of the first multimedia message is a broadcast to the first secondary device and the second secondary device, for outputting the first multimedia information via the first output device and a second output device of the second secondary device, and comprises an instruction to the second secondary device to delay outputting the first multimedia information for a duration substantially equal to the first duration minus the second duration.

8. The method of claim 7, wherein:
the first multimedia message further comprises first multimedia audio information, for outputting via a first speaker of the first secondary device and for outputting via a second speaker of the second secondary device, and an instruction to the second secondary device to delay outputting the first multimedia audio information for a duration substantially equal to the first duration minus the second duration; wherein the method further comprises:

outputting, at a time substantially equal to the start time plus the first duration, the first multimedia audio information via a speaker of the primary device.

9. The method of claim 1 wherein:
the primary device is an in-vehicle infotainment system.

10. The method of claim 1 wherein:
the first secondary device is a mobile device.

11. The method of claim 1 wherein:
the first message and the first multimedia message are sent via a wireless network.

12. The method of claim 1 wherein the first multimedia information comprises at least one of:
pre-recorded video information; or
live-streaming video information.

13. A system, comprising:
one or more memories; and
one or more processors configured to execute instructions stored in the one or more memories to:

send a first message from a primary device to a first secondary device, comprising first multimedia information and an instruction to record a first time at which the first secondary device outputs the first multimedia information via a first output device of the first secondary device, wherein the primary device and the first secondary device have independently synchronized their respective clocks to an external reference based on global navigation satellite system (GNSS) transmissions;

receive a first response from the first secondary device at the primary device, the first response comprising the first time;

determine a first duration based on a difference between a time at the sending of the first message and the first time;

send, at a start time, a first multimedia message comprising first multimedia information from the primary device to the first secondary device for outputting via the first output device; and output, at a time substantially equal to the start time plus the first duration, the first multimedia information via an output device of the primary device.

14. The system of claim 13, wherein the instructions include instructions to:

send a second message from the primary device to a second secondary device;

receive a second response from the second secondary device at the primary device;

determine a second duration based on the second message and the second response;

determine that the first duration is greater than the second duration; and send, at a time substantially equal to the start time plus the first duration minus the second duration, a second multimedia message comprising the first multimedia information from the primary device to the second secondary device for outputting via a second output device of the second secondary device.

15. The system of claim 13, wherein the instructions include instructions to:

send a second message from the primary device to a second secondary device;

receive a second response from the second secondary device at the primary device;

determine a second duration based on the second message and the second response; and determine that the first duration is greater than the second duration; wherein the instruction to send the first multimedia message is an instruction to broadcast the first multimedia message to the first secondary device and the second secondary device, for outputting the first multimedia information via the first output device and a second output device of the second secondary device; and the first multimedia message comprises an instruction to the second secondary device to delay outputting the first multimedia information for a duration substantially equal to the first duration minus the second duration.

16. A non-transitory computer-readable medium storing instructions operable to cause one or more processors to perform operations comprising:

sending a first message from a primary device to a first secondary device, comprising first multimedia information and an instruction to record a first time at which the first secondary device outputs the first multimedia information via a first output device of the first secondary device, wherein the primary device and the first secondary device have independently synchronized their respective clocks to an external reference based on global navigation satellite system (GNSS) transmissions;

receiving a first response from the first secondary device at the primary device, the first response comprising the first time;

determining a first duration based on a difference between a time at the sending of the first message and the first time;

sending, at a start time, a first multimedia message comprising first multimedia information from the primary device to the first secondary device for outputting via the first output device; and outputting, at a time substantially equal to the start time plus the first duration, the first multimedia information via an output device of the primary device.

17. The medium of claim 16, the operations further comprising:

sending a second message from the primary device to a second secondary device;

receiving a second response from the second secondary device at the primary device;

determining a second duration based on the second message and the second response;

determining that the first duration is greater than the second duration; and sending, at a time substantially equal to the start time plus the first duration minus the second duration, a second multimedia message comprising the first multimedia information from the primary device to the second secondary device for outputting via a second output device of the second secondary device.

18. The medium of claim 16, the operations further comprising:

sending a second message from the primary device to a second secondary device;

receiving a second response from the second secondary device at the primary device;

determining a second duration based on the second message and the second response; and determining that the first duration is greater than the second duration; wherein the sending of the first multimedia message is a broadcast to the first secondary device and the second secondary device, for outputting the first multimedia information via the first output device and a second output device of the second secondary device; and the first multimedia message comprises an instruction to the second secondary device to delay outputting the first multimedia information for a duration substantially equal to the first duration minus the second duration.

* * * * *